United States Patent [19]
Hashimoto et al.

[11] Patent Number: 5,362,158
[45] Date of Patent: Nov. 8, 1994

[54] BEARING UNIT AND ELECTRIC PUMP USING THE SAME

[75] Inventors: Kazuyuki Hashimoto, Shizuoka; Hiroki Jin, Aichi, both of Japan

[73] Assignee: NTN Corporation, Osaka, Japan

[21] Appl. No.: 46,406

[22] Filed: Apr. 12, 1993

[30] Foreign Application Priority Data

Apr. 13, 1992 [JP] Japan ............................ 4-023349[U]

[51] Int. Cl.$^5$ .............................................. F16C 19/50
[52] U.S. Cl. ...................................... 384/447; 384/490
[58] Field of Search .............. 384/447, 456, 490, 255, 384/537, 560

[56] References Cited
U.S. PATENT DOCUMENTS

| | | |
|---|---|---|
| 2,236,244 | 3/1941 | Cornelius . |
| 2,675,759 | 4/1954 | Yarger . |
| 4,836,755 | 6/1989 | Nitsche . |
| 5,033,945 | 7/1991 | Kolb .................. 403/383 X |
| 5,259,677 | 11/1993 | Degrange et al. ............. 384/537 X |

FOREIGN PATENT DOCUMENTS

| | | |
|---|---|---|
| 0255147 | 7/1987 | European Pat. Off. . |
| 2-146220 | 12/1990 | Japan . |
| 3-41176 | 4/1991 | Japan . |

*Primary Examiner*—Thomas R. Hannon
*Attorney, Agent, or Firm*—Flehr, Hohbach, Test, Albritton & Herbert

[57] ABSTRACT

A bearing unit which comprises a bearing main body and a balancer. The bearing main body includes an inner ring member which is fixed to one end of an output shaft of a drive source and which has its axis eccentric with respect to an axis of the output shaft, an outer ring member whose diameter is larger than that of the inner ring member, and a plurality of rolling elements interposed between the inner ring member and the outer ring member. The balancer is formed integrally with the inner ring member in a direction in which an axis of the output shaft is eccentric with respect to an axis of the inner ring member and corrects dynamic unbalance caused by an eccentric movement of the bearing main body together with the rotation of the output shaft.

2 Claims, 3 Drawing Sheets

5,362,158

BEARING UNIT AND ELECTRIC PUMP USING THE SAME

BACKGROUND OF THE INVENTION

1. Field of the Invention

The present invention relates to a bearing unit which is fixed to the circumferential surface of an output shaft at a vicinity of one end thereof and makes an eccentric motion by rotation of the output shaft, and an electric pump using this bearing unit.

2. Description of the Related Art

Conventionally, an electric pump, for example, an oil pump used in an automobile braking device, is driven by causing a rolling contact bearing (such as a ball bearing and a roller bearing), which supports an output shaft, to make an eccentric motion. There are various eccentric motion structures of a bearing for an output shaft used in such an electric pump. By way of example, the following types of structures are known: a structure in which an output shaft of a motor is formed by cutting work so that it may be brought into a state of eccentricity and a bearing whose inner and outer rings are concentric with each other is attached to the output shaft of the motor; a structure in which an inner ring of a bearing is decentered without causing an output shaft in itself to be decentered; a structure in which an eccentric bush is fitted into an inner ring through a hole in a bearing, and the like.

An example of other structures is disclosed in Japanese Utility Model Laid-Open No. 2-146220 (1990). According to this structure, an axis of an inner ring of a bearing which supports an output shaft is decentered from an axis of the output shaft, and this decentering causes a rotational motion of the output shaft to be converted to an eccentric motion.

A further example is disclosed in Japanese Utility Model Laid-Open No. 3-41176 (1991). In this structure, inner and outer rings of a bearing are concentric with each other without causing the inner ring to be decentered from an axis of the outer ring. A decentered eccentric ring is fitted into a shaft center portion of the inner ring and the output shaft is fitted into a through hole of this eccentric ring, thereby causing a rotational motion of the output shaft to be converted to an eccentric motion.

However, in either case, unbalance arises from the axes of the output shaft and the bearing being decentered from each other and in a static state in which a motor is not being driven. This necessarily causes an unbalance in a dynamic state in which the motor is being driven. Therefore, these conventional structures have problems in that unbalance in a dynamic state causes vibration and the like, so that the bearing, the drive source of the motor, and the like may be damaged, and that the noise of an electric pump is increased.

SUMMARY OF THE INVENTION

In view of the aforementioned, it is an object of the present invention to obtain a bearing unit being capable of correcting and solving dynamic unbalance when a bearing is eccentric, and to obtain an electric pump using this bearing unit.

A first aspect of the present invention is a bearing unit which comprising: a bearing main body including an inner ring member which is fixed to one end of an output shaft of a drive source and has its axis eccentric with respect to an axis of the output shaft, an outer ring member whose diameter is larger than that of the inner ring member, and a plurality of rolling elements interposed between the inner ring member and the outer ring member; and a balancer which is formed with the inner ring member in a direction in which an axis of the output shaft is eccentric with respect to the axis of the inner ring member and which corrects dynamic unbalance resulting from an eccentric motion of the bearing main body together with the rotation of the output shaft.

A second aspect of the present invention is that, in the first aspect of the present invention, the balancer is an extended portion which protrudes from one end of the inner ring member in the axial direction thereof and which extends from the inner ring member in the radial direction thereof.

A third aspect of the present invention is that, in the second aspect of the present invention, the extended portion extends within a range from the vicinity of the outer periphery of the inner ring member to the outer periphery of the outer ring member.

A fourth aspect of the present invention is an electric pump comprising: a motor; an eccentric cam which makes an eccentric motion by driving the motor; a reciprocating member which reciprocates in a state of being in contact with the circumferential surface of the eccentric cam; and a pump which feeds by pressure a fluid by a reciprocating motion of the reciprocating member. The eccentric cam includes: a bearing main body including an inner ring member which is fixed at one end of an output shaft of a motor and has its axis eccentric with respect to an axis of the output shaft, an outer ring member whose diameter is larger than that of the inner ring member, and a plurality of rolling elements interposed between the inner ring member and the outer ring member; and a balancer which is formed with the inner ring member in a direction in which an axis of the output shaft is eccentric with respect to the axis of the inner ring member and which corrects dynamic unbalance resulting from an eccentric motion of the bearing main body together with the rotation of the output shaft.

A fifth aspect of the present invention is that, in the fourth aspect of the present invention, the balance is an extended portion which protrudes from one end of the inner ring member in the axial direction thereof and which extends from the inner ring member in the radial direction thereof.

A sixth aspect of the present invention is that, in the fifth aspect of the present invention, the extended portion extends within the range from the vicinity of the outer periphery of the inner ring member to the outer periphery of the outer ring member.

According to the first aspect of the present invention, the bearing main body comprises the inner ring member, the outer ring member, and a plurality of rolling elements interposed between the inner ring member and the outer ring member. Since the inner ring member is fixed to one end of the output shaft and has its axis eccentric with respect to an axis of the output shaft, the inner ring member and therefore the bearing main body make an eccentric motion by rotation of the output shaft.

Thereupon, according to the present invention, the balancer, which corrects dynamic unbalance arising from the eccentric motion of the bearing main body together with the rotation of the output shaft, is formed with the inner ring member in a direction in which the axis of the output shaft is eccentric with respect to the axis of the inner ring member. Accordingly, this balancer corrects dynamic unbalance so that the bearing unit can be brought into a balanced state. Therefore, the bearing unit according to the present invention allows the bearing unit to make an eccentric motion in a balanced state at the time of rotation of the output shaft.

As a result, it is possible to prevent the occurrence of vibration and the like, which is caused by dynamic unbalance during rotation of the output shaft. Therefore, it is possible to keep the bearing unit and the drive source from being damaged, and to prevent operational noise from increasing.

According to the second aspect of the present invention, since, in the first aspect of the present invention, the balancer is comprised of the extended portion which protrudes from one end of the inner ring member in the axial direction thereof and which extends from the inner ring member in the radial direction thereof, the bearing unit can be made smaller in size in its axial direction.

According to the third aspect of the present invention, since, in the second aspect of the present invention, the extended portion extends within the range from the vicinity of the outer periphery of the inner ring member to the outer periphery of the outer ring member, it is possible to make the bearing unit smaller in size not only in its axial direction but also in its radial direction, thereby resulting in a reduced space for the eccentric motion.

In the fourth aspect of the present invention, driving the motor causes the eccentric cam to make an eccentric motion. Accordingly, the reciprocating member being in contact with the circumferential surface of the eccentric cam moves reciprocatingly. Thereby, a fluid is fed by pressure from the pump. In addition, since the eccentric cam of the present invention can make an eccentric motion which is balanced dynamically, it is possible for the electric pump to operate stably and to improve its durability. Further, operational noise of the electric pump can be also reduced.

According to the fifth aspect of the present invention, since, in the fourth aspect of the present invention, the balancer is used which is made smaller in size in its axial direction, the space for accommodating the eccentric cam can be reduced, and therefore it is useful for making the electric pump smaller in size.

According to the sixth aspect of the present invention, since, in the fifth aspect of the present invention, the balancer is used which is made smaller in size in its axial and radial directions, the space for accommodating the eccentric cam can be further reduced, and therefore it is useful for making the electric pump even smaller. In addition, since the extended portion of the balancer is not extended over the outer periphery of the outer ring member, it is possible to prevent interference between the reciprocating member and the balancer during an eccentric motion of the eccentric cam. Thus, the reciprocating member can smoothly reciprocate, so that the electric pump can operate stably.

BRIEF DESCRIPTION OF THE DRAWINGS

FIG. 2 is used.

DESCRIPTION OF THE PREFERRED EMBODIMENTS

Figure 1:
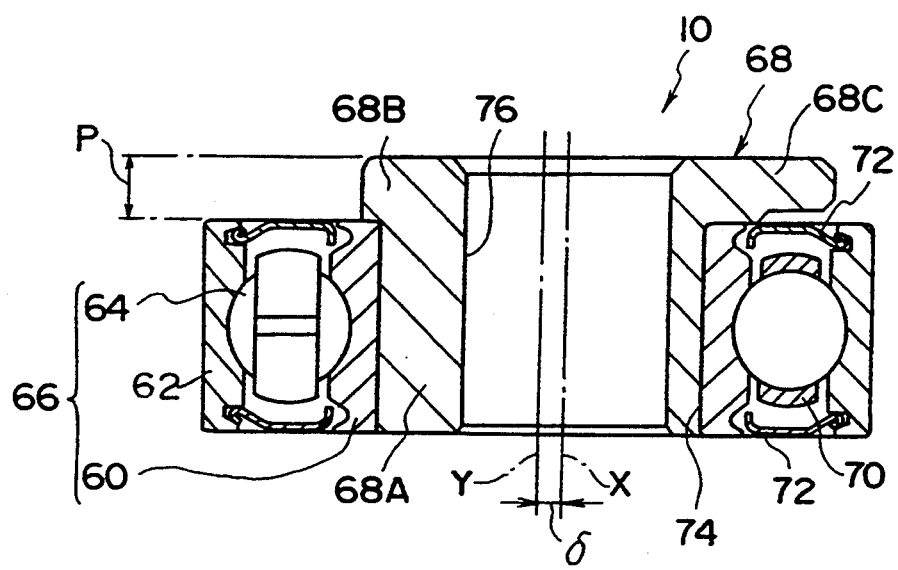
FIG. 1 is a sectional view illustrating a state in which a bearing unit according to an embodiment of the present invention is cut in a plane including an axis.
Figure 2:
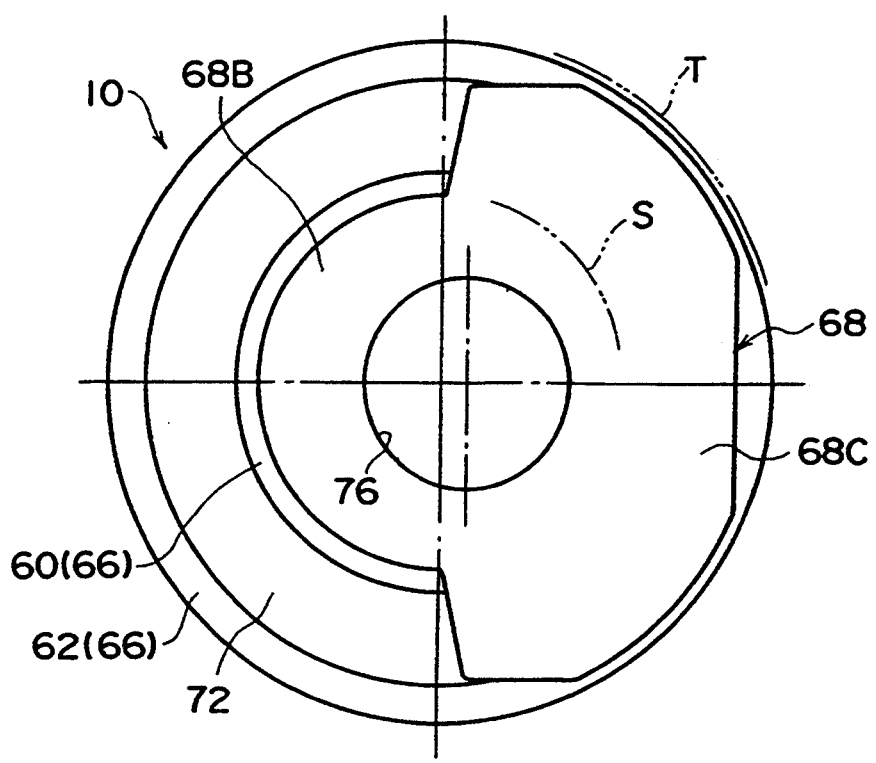
FIG. 2 is a plan view of the bearing unit of FIG. 1.
Figure 3:
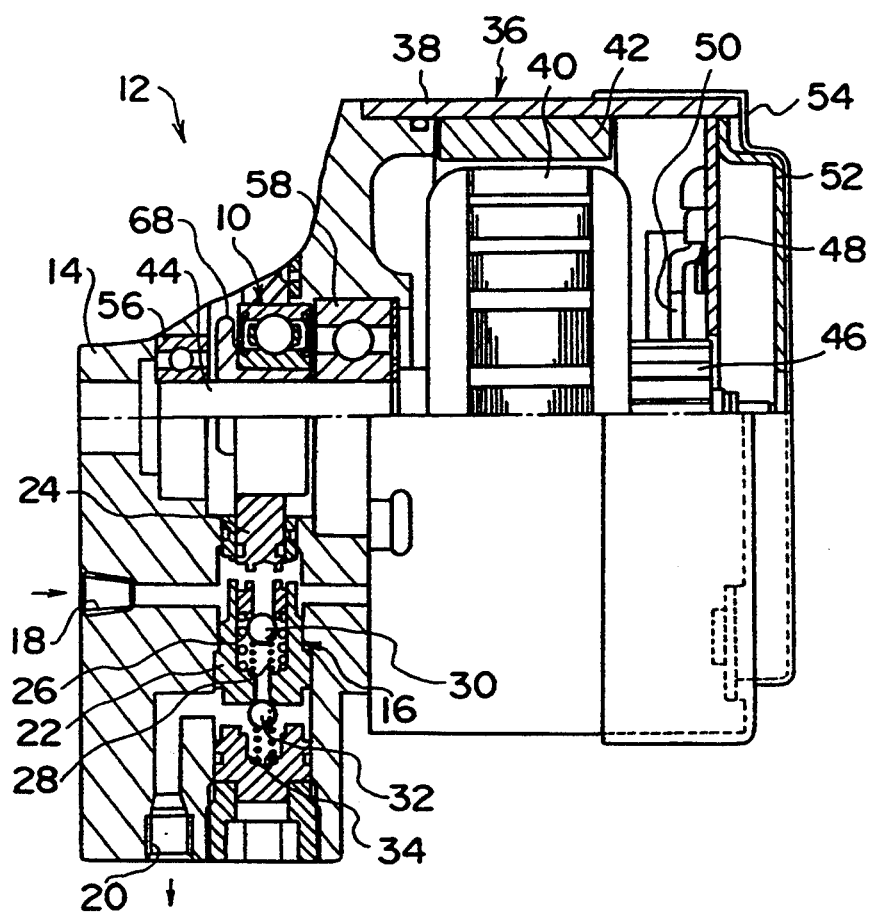
FIG. 3 is a schematic sectional view illustrating an electric pump in which the bearing unit of FIG. 1

Referring now to FIG. 1 to FIG. 3, a bearing unit 10 according to an embodiment of the present invention and an electric pump 12 using the bearing unit 10 will be described hereinafter.

In FIG. 3, the electric pump 12 provided with the bearing unit 10 is shown and is used in an automobile braking device. The electric pump 12 is provided with a pump housing 14 which is formed into a substantially columnar shape and is made of aluminium die-cast or the like. In a radial direction of the pump housing 14, a plurality of pump sections 16 (only one section is shown in FIG. 3) is disposed. These plurality of pump sections 16 in their entirety corresponds to "pump section" which is described in the appended claims.

The structure of the pump sections 16 is well-known. It will be explained herein briefly. A substantially columnar-shaped accommodation space is formed in the pump housing 14. Within this space, an inlet hole 18 and a discharge hole 20 for feeding oil by pressure, both of which are formed in the pump housing 14, are connected with each other via a passage.

Further, a plunger support 22 is tightly fitted within the accommodation space. Inside the plunger support 22, a plunger 24 serving as a reciprocating member is contained so as to be capable of reciprocating. In a central portion of the plunger 24, a passage is formed, which allows the inflow of oil. In addition, the plunger 24 is pressed and urged by a compression coil spring 26. A check ball 30 which is pressed and urged by a compression coil spring 28, is brought into contact with the lower portion of the plunger 24 in the axial direction thereof so as to be capable of being separated therefrom. In a position opposed to the check ball 30, another check ball 32 is pressed and urged by a compression coil Spring 34. These check balls 30, 32 constitute a check valve.

Thus, the plunger 24 reciprocates by the eccentric motion of the bearing unit 10 which will be described below, so that the check balls 30, 32 are brought into an open or closed state. This operation allows for the inflow and discharge of oil. Meanwhile, the state of the check balls 30, 32 which is shown in FIG. 3 is indicated immediately after the oil is fed by pressure.

On the other hand, a yoke 38 of a motor section 36 is fixed to the pump housing 14. The yoke 38 is formed into a cylindrical shape with a rotator 40 accommodated therein. At the outer periphery of the rotator 40, an arc-shaped magnet 42 is fixed to the yoke 38. Further, a commutator 46 is disposed at the rear end of a shaft 44, serving as an output shaft of the rotator 40, in the axial direction of the shaft 44. A brush 50 which is mounted to a support plate 48 contacts and slides with the commutator 46. An end frame 52 is disposed behind the support plate 48, so that the open end portion of the yoke 38 may be closed. A water-proof cover 54 is covered in the state in which the end frame 52 closes the open end portion of the yoke 38.

A front end portion of the shaft 44 for the rotator 40 in the axial direction of the shaft 44 is supported by a pair of ball bearings 56, 58. The bearing unit 10 is secured between the ball bearings 56, 58, and it is described below by referring particularly to FIG. 1 and FIG. 2.

As shown in these drawings, the bearing unit 10 is composed of a well-known ball bearing 65 including an inner ring 60, an outer ring 62, and a plurality of balls 64 as main parts, and a substantially cylinder-shaped bush 68.

Briefly, the ball bearing 66 is constructed such that the inner ring 60 and the outer ring 62 whose diameter is larger than that of the inner ring 60 are disposed concentrically with each other. A plurality of balls 64 is disposed so as to be accommodated between the inner ring 60 and the outer ring 52. These balls 64 are supported so as to be capable of rolling by a retainer 70 (in FIG. 1, two different positions in which the retainer 70 is cut are shown). Further, each opening portion between both ends of the inner ring 60 and those of the outer ring 62 in their axial direction is sealed by lips 72 each of which is disposed at the vicinity of both ends of the inner ring 60 and the outer ring 62 in their axial direction. Then, a leading end portion of the plunger 24 contacts one portion of the circumferential surface of the outer ring 62.

A bush 68 which is made of a metallic material or the like and which is formed into a substantially cylindrical shape, is fixed by press-fitting into a through hole 74 of the inner ring 60. The bush 68 comprises three portions, i.e., a cylindrical-shaped boss 68A, a protruded portion 68B which protrudes by the amount of protrusion P in one direction of the axial direction of the boss 68A (in the upward direction in FIG. 1), and an extended portion 68C which extends from the protruded portion 68B in the radial direction of the ball bearing 66. Among these, the extended portion 68C corresponds to a balancer which will be described in the claims.

The axis X of a shaft 44 which is inserted into a through hole 76 formed in the boss 68A is eccentric with respect to the axis Y (which is also the axis of the outer ring 62) of the inner ring 60 of the ball bearing 66 by the amount δ. The extended portion 68C is formed in the direction in which the axis X is eccentric with respect to the axis Y, so as to be integrated with the boss 68A. The extended portion 68C extends within a range from the inside periphery of the inner ring 60 (in FIG. 2, only one portion of the inside periphery S is indicated by a two-dot chain line) to the outer periphery of the outer ring 62 (in FIG. 2, only one portion of the outer periphery T is indicated by a two-dot chain line). More concretely, the extended portion 68C extends to an extent in which the extended portion covers approximately one half the area (approximately a semicircular portion) of the ball bearing 66 from a plan view, as will be seen in FIG. 2. Therefore, the extension of the extended portion 68C is sufficiently large with respect to the protrusion of the protruded portion 68B.

The inner ring 60 of the ball bearing 66 and the boss 68A of the bush 68 refer to an inner ring member which will be described in the claims. Thus, the inner ring 60, the boss 68A, the outer ring 62 as an outer ring member, and a plurality of balls 64 each of which is a rolling element, constitute a bearing main body which will be described in the claims.

The operation of the present embodiment will be described hereinafter.

When a power supply (not shown) is switched on, electric power is supplied to the rotator 40 via the brush 50 and the commutator 46 such that the rotator 40 rotates. The rotation of the rotator 40 allows the shaft 44 to rotate, and the bearing unit 10 makes an eccentric motion. This eccentric motion causes the plunger 24 to reciprocate, so that the check balls 30, 32 may open and close. Thereby, oil can flow therein from the inlet hole 18 and be discharged from the discharge hole 20.

Since the bush 68 is fitted into the through hole 74 of the inner ring 60 of the ball bearing 65 and the protruded portion 68B and the extended portion 68C balance the bearing unit, it is possible to correct a dynamically unbalanced state so as to be changed to a balanced state when the bearing unit 10 makes an eccentric motion. Accordingly, it is possible to prevent the occurrence of vibration or the like of the electric pump 12 caused by a dynamic unbalance of the bearing unit 10 during the eccentric motion of the bearing unit 10. Therefore, the bearing unit 10 and the drive source can be kept from being damaged, and it is possible for the electric pump 12 to operate stably and to improve its durability. In addition, operation noise of the electric pump 12 can be also reduced.

Further, since the protrusion of the protruded portion 68B of the bush 68 provided in the bearing unit 10 is decreased and the extension of the extended portion 68C is sufficiently increased relative to the protrusion, the bearing unit 10 can be made smaller in size in both of the axial and radial directions. Accordingly, the space required for the bearing unit 10 in the pump housing 14 of the electric pump 12 can be reduced. Therefore the electric pump 12 can be made smaller in size.

In addition, since the extended portion 68C extends within the range from the inside periphery S of the inner ring 60 to the outer periphery T of the outer ring 62, the space for which the extended portion 68C makes an eccentric motion during an eccentric motion of the bearing unit 10, can be minimized, and interference between the leading end portion of the extended portion 68C and the plunger 24 can be prevented. Therefore, the electric pump 12 can operate smoothly.

Although a ball bearing 66 is used in this embodiment, the present invention is not limited to the same. A roller bearing and the like may be employed. Any rolling contact bearing is applicable.

Further, although a bush 68 in which a boss 68A, a protruded portion 68B, and an extended portion 68C are integrated with each other, is used in this embodiment, the present invention is not limited to the same. If the assembly of the bush can be performed stably, another construction in which the boss 68A is separated from the protruded portion 68B and the extended portion 68C, and the boss 68A is formed integrally with the inner ring 60 may also be applied to the present invention.

What is claimed is:

1. An electric pump having a motor, an eccentric cam that makes an eccentric motion by driving said motor, a reciprocating member that reciprocates in a state of being in contact with a circumferential surface of said eccentric cam, and a pump that feeds a fluid by pressure produced by a reciprocating motion of said reciprocating member, wherein said eccentric cam comprises:
a ball bearing main body including a boss that is fixed to one end of an output shaft provided on a drive source and which has its axis eccentric with respect to an axis of said output shaft, an inner ring press-fitted to a circumferential surface of said boss, an outer ring whose diameter is larger than that of said inner ring, and a plurality of balls interposed between said inner ring and said outer ring; and a balancer that is formed integrally with said boss in a direction in which the axis of said output shaft is eccentric with respect to an axis of said boss and which protrudes from one end of said boss in the axial direction thereof and extends within the range from the vicinity of the outer periphery of said inner ring to the outer periphery of said outer ring, said balancer correcting a dynamic unbalance caused by an eccentric movement of said ball bearing main body together with the rotation of said output shaft.

2. A bearing unit according to claim 1, wherein the extension of said balancer is an area in which said balancer covers substantially a half of said plurality of balls from a plan view.

* * * * *